US011083133B2

(12) United States Patent
Lowe

(10) Patent No.: US 11,083,133 B2
(45) Date of Patent: Aug. 10, 2021

(54) DOUBLE DISC COUNTER ROTATION MULCHING MOWER ASSEMBLY

(71) Applicant: GSL Innovation Inc., Stoney Creek (CA)

(72) Inventor: Gareth Lowe, Stoney Creek (CA)

(73) Assignee: MULCH MASTERS, LLC, Thomson's Station, TN (US)

( * ) Notice: Subject to any disclaimer, the term of this patent is extended or adjusted under 35 U.S.C. 154(b) by 666 days.

(21) Appl. No.: 15/994,191

(22) Filed: May 31, 2018

(65) Prior Publication Data

US 2018/0343797 A1 Dec. 6, 2018

Related U.S. Application Data

(60) Provisional application No. 62/512,903, filed on May 31, 2017.

(51) Int. Cl.
| | | |
|---|---|---|
| *A01D 34/52* | (2006.01) | |
| *A01D 34/73* | (2006.01) | |
| *A01D 34/66* | (2006.01) | |
| *A01D 34/81* | (2006.01) | |
| *A01D 34/00* | (2006.01) | |

(52) U.S. Cl.
CPC .......... *A01D 34/73* (2013.01); *A01D 34/005* (2013.01); *A01D 34/66* (2013.01); *A01D 34/81* (2013.01)

(58) Field of Classification Search
USPC .................................................. 56/255, 295
See application file for complete search history.

(56) References Cited

U.S. PATENT DOCUMENTS

| | | | | |
|---|---|---|---|---|
| 2,659,398 A | * | 11/1953 | Marvin ................ | B23D 61/025 83/837 |
| 3,818,957 A | * | 6/1974 | Schoonover ........... | A01G 3/002 144/34.1 |
| 4,946,488 A | * | 8/1990 | Davison ............... | A01G 23/093 56/14.9 |
| 4,992,791 A | * | 2/1991 | Olson ................... | H03M 1/668 341/126 |
| 4,998,573 A | * | 3/1991 | York .................... | A01G 23/091 144/235 |
| 5,211,212 A | * | 5/1993 | Carlson ................ | A01G 23/091 144/241 |
| 6,546,977 B1 | * | 4/2003 | Monyak ............... | A01G 23/067 144/235 |
| 7,152,640 B1 | * | 12/2006 | Williams .............. | A01G 23/091 144/4.1 |
| 2008/0098704 A1 | * | 5/2008 | Dairon ................. | A01D 34/81 56/11.9 |
| 2018/0288938 A1 | * | 10/2018 | Wood ..................... | A01D 34/73 |

* cited by examiner

*Primary Examiner* — Thomas B Will
*Assistant Examiner* — Mai T Nguyen
(74) *Attorney, Agent, or Firm* — Emerson, Thomson & Bennett, LLC; Roger D Emerson

(57) ABSTRACT

A mower assembly for cutting and mulching material. The mower assembly comprises a mower housing, a first disc cutter, a second disc cutter and an anvil. The first and second disc cutters are orientated such that their outer edges are spaced apart so that counter-rotation of the discs urges material to move between the discs from an inlet area toward an outlet area. Material travelling from the inlet area to the outlet area is subject to cutting and shredding by cutting teeth on the disc cutters. Material moving into the outlet area is subjected to further cutting and shredding through contact with the anvil.

18 Claims, 11 Drawing Sheets

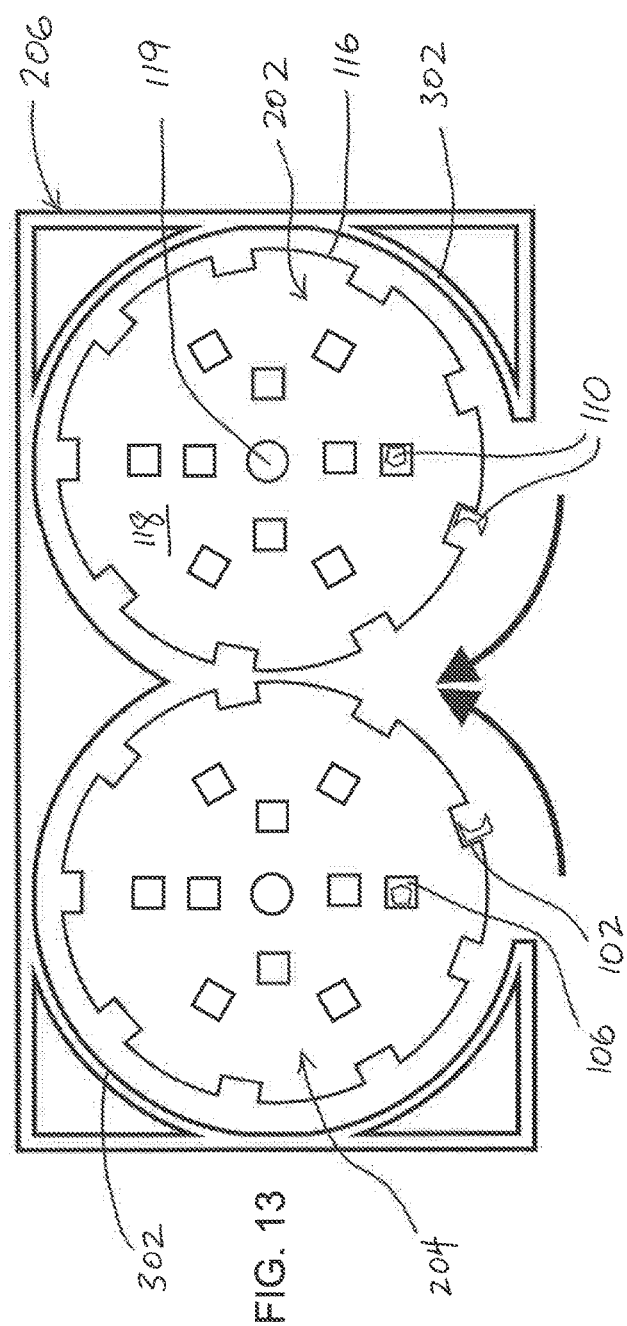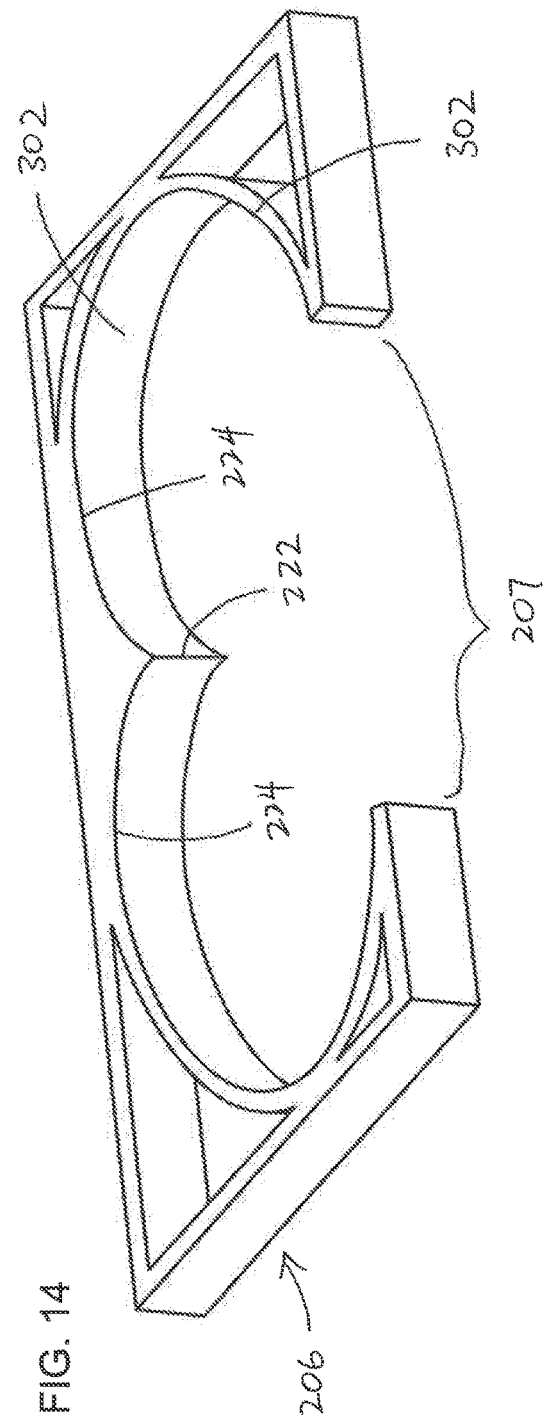

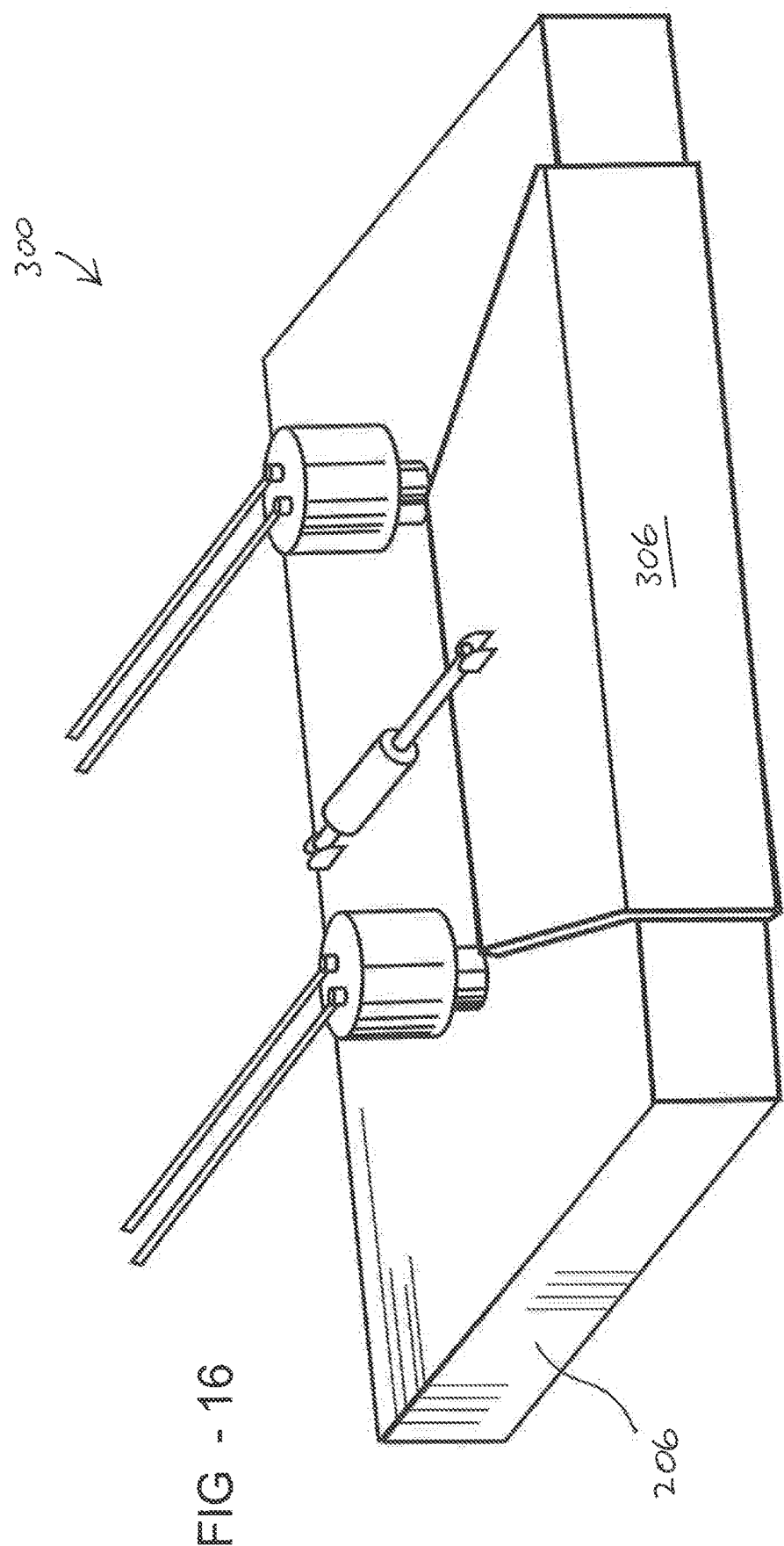

DOUBLE DISC COUNTER ROTATION MULCHING MOWER ASSEMBLY

FIELD OF THE INVENTION

The present invention relates generally to brush and tree clearing apparatuses, and more particularly to a counter rotating mulching mower assembly that can be mounted to a skid steer or other type of vehicle for clearing brush and small trees, reducing the cutting material to small chips.

BACKGROUND OF THE INVENTION

Land preparation and clearing equipment is used to remove brush, trees, vegetation and other debris in order to prepare the land for development, such as construction or agriculture.

Multi-purpose machines, such as skid steers or tractors, may be outfitted with a variety of attachments to perform different tasks such as mulching, cutting, grinding, or shredding of vegetation, trees, brush and other matter.

In order to carry out mulching operations, a multi-purpose machine may be outfitted with a mulching mower that, in the prior art, is comprised of a single rotating blade of approximately 54" in diameter. The use of a single rotating blade, also referred to as a disc or rotor, of that size presents many problems, including the possibility of debris shooting from the side which may hit bystanders. Clogging and tipping of a single rotor/disc due to the weight and size of the blade also tends to be problematic. There is a need for a mulching mower assembly that directs debris and cutting materials internally, that uses smaller blades to prevent tipping, and that minimizes clogging.

SUMMARY OF THE INVENTION

The present invention pertains to a mower assembly for cutting and mulching material, the mower assembly comprising a mower housing having an inlet, an opposed back wall, an inlet area adjacent the inlet, and an outlet area adjacent the back wall; a first disc cutter having a first outer edge, the first disc cutter rotatably mounted to the mower housing for rotation in a first direction; a second disc cutter having a second outer edge, the second disc cutter rotatably mounted to the mower housing for rotation in a second opposite direction; each disc cutter having a top surface and a bottom surface, the first and second disc cutters orientated to form a common plane and positioned such that the first outer edge and the second outer edge are spaced apart, counter-rotation of the first disc cutter and the second disc cutter urging material at the inlet area to travel between the first and second disc cutters towards the outlet area within the mower housing, material travelling from the inlet area to the outlet area being subject to cutting and shredding by cutting teeth on said first and second disc cutters; and an anvil mounted to the mower housing in the outlet area for further cutting and shredding of the material.

The invention also provides a mower assembly for cutting and mulching material, the mower assembly comprising a mower housing having an inlet, an opposed back wall, an inlet area adjacent the inlet, and an outlet area adjacent the back wall; a first disc cutter having a first outer edge, the first disc cutter rotatably mounted to the mower housing for rotation in a first direction; a second disc cutter having a second outer edge, the second disc cutter rotatably mounted to the mower housing for rotation in a second opposite direction; each disc cutter having a top surface and a bottom surface, the first and second disc cutters orientated such that the first outer edge and the second outer edge are spaced apart, counter-rotation of the first disc cutter and the second disc cutter urging material at the inlet area to travel between the first and second disc cutters towards the outlet area within the mower housing, material travelling from the inlet area to the outlet area being subject to cutting and shredding by cutting teeth on said first and second disc cutters; and an anvil comprising a vertical cutting edge extending from the back wall between the first and second disc cutters, the vertical cutting edge for cutting material travelling from said inlet area to said outlet area, each disc cutter having inner cutting teeth, each inner cutting tooth having an upper cutting edge and a lower cutting edge extending, respectively, from the top surface and the bottom surface of its corresponding disc cutter, the inner cutting teeth for cutting material above the top surfaces and below the bottom surfaces.

In another aspect the invention provides mower assembly for cutting and mulching material, the mower assembly comprising a mower housing having an inlet, an opposed back wall, an inlet area adjacent the inlet, and an outlet area adjacent the back wall; a first disc cutter having a first outer edge, the first disc cutter rotatably mounted to the mower housing for rotation in a first direction; a second disc cutter having a second outer edge, the second disc cutter rotatably mounted to the mower housing for rotation in a second opposite direction; each disc cutter having a top surface and a bottom surface, the first and second disc cutters orientated such that the first outer edge and the second outer edge are spaced apart, counter-rotation of the first disc cutter and the second disc cutter urging material at the inlet area to travel between the first and second disc cutters towards the outlet area within the mower housing, material travelling from the inlet area to the outlet area being subject to cutting and shredding by said first and second disc cutters; and an anvil mounted to the mower housing in the outlet area for further cutting and shredding of the material, the mower housing including arcuate inner walls shaped to follow the curvatures of the first and second outer edges of the first and second disc cutters, the inner walls configured to discourage a build-up of material within the mower housing and to help prevent ejection of material through the inlet.

BRIEF DESCRIPTION OF THE DRAWINGS

The present will now be describe by way of example only with reference to the following drawings in which:

FIG. 13 is a schematic top view of two counter rotating cutting discs in a counter rotating mulching mower assembly according to an alternative embodiment.

FIG. 14 is a top perspective view of a mower housing of FIG. 13 in isolation.

FIG. 16 is a schematic top front perspective view of the counter rotating mulching mower assembly of FIG. 15 in use with an inlet cover.

DETAILED DESCRIPTION OF THE PREFERRED EMBODIMENTS

Figure 1:
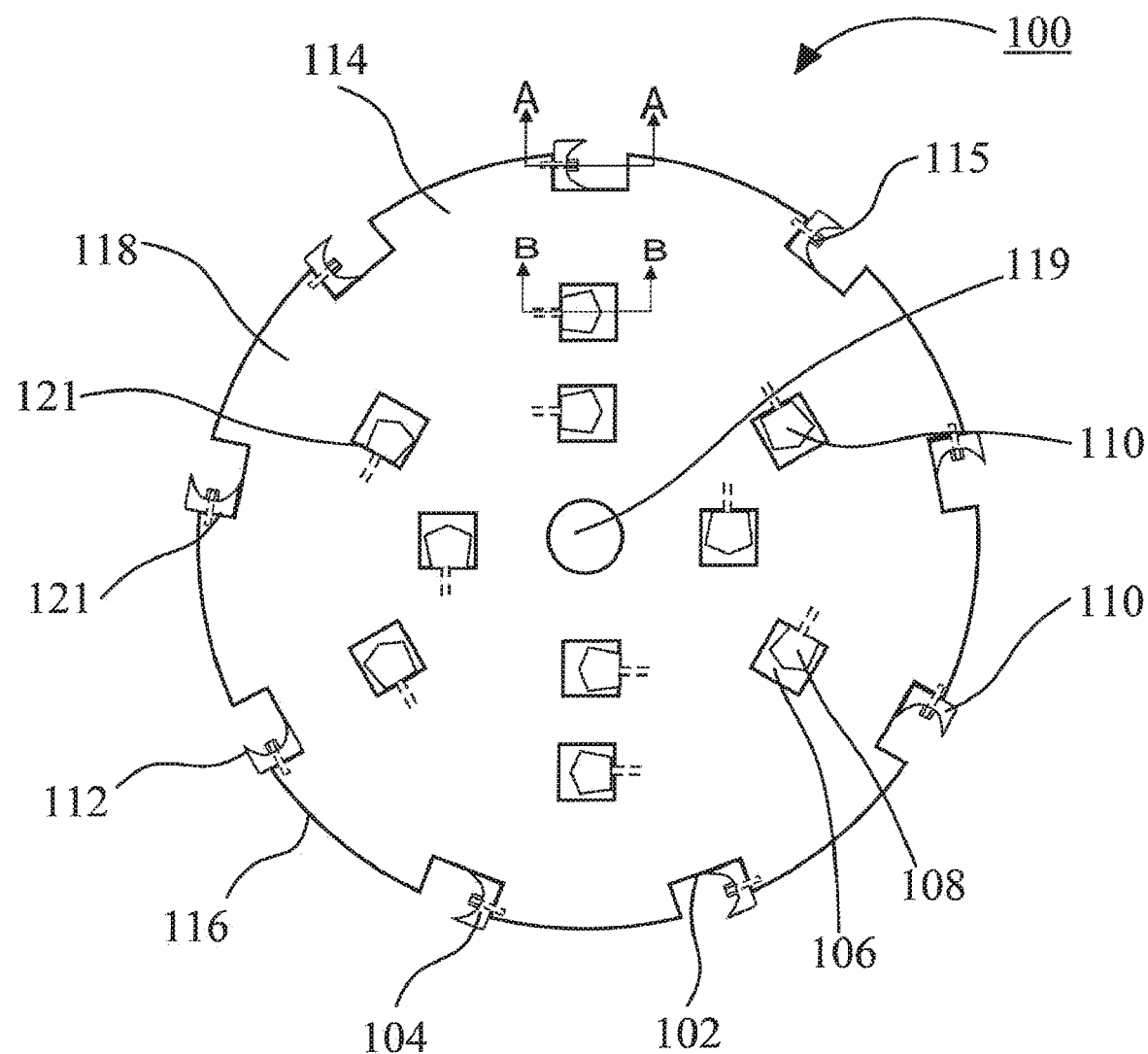
FIG. 1 is a schematic plan view of a disc cutter.
Figure 2:
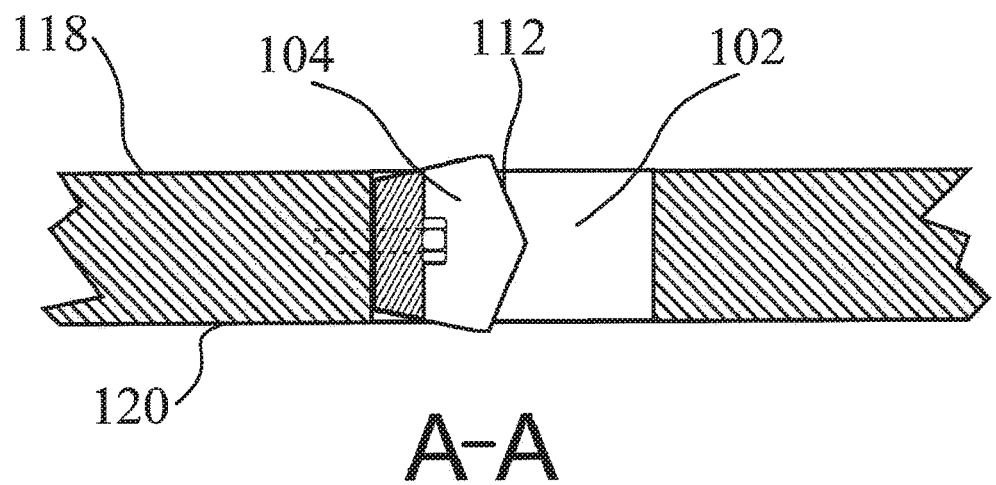
FIG. 2 is a cross section of section A-A of the disc cutter in FIG. 1.
Figure 3:
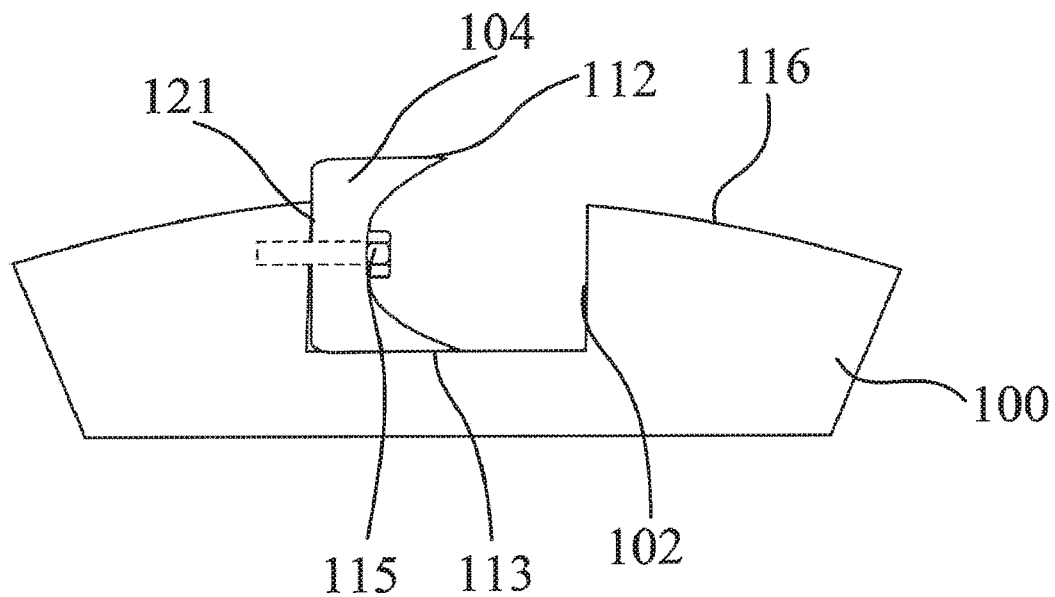
FIG. 3 is a side elevation view of an outer cutting tooth mounted in a cutter recess on the disc cutter.
Figure 4:
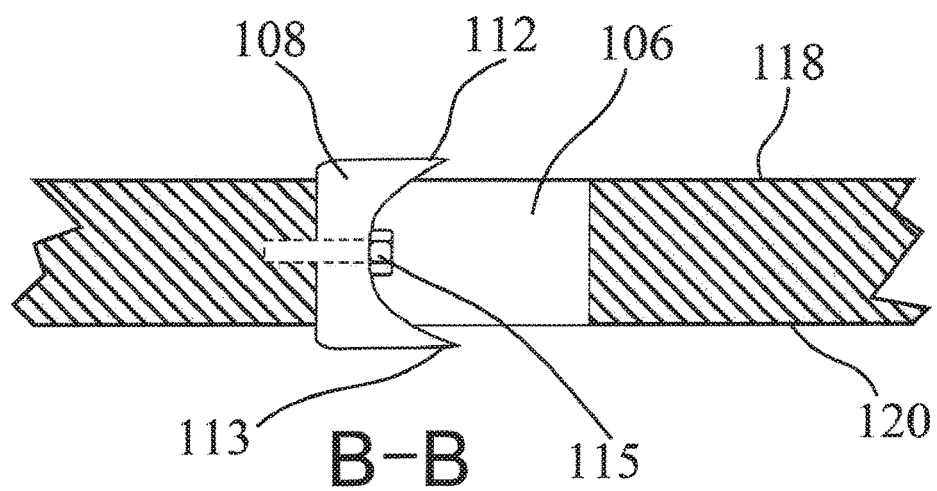
FIG. 4 is a cross section of section B-B of the disc cutter in FIG. 1.
Figure 5:
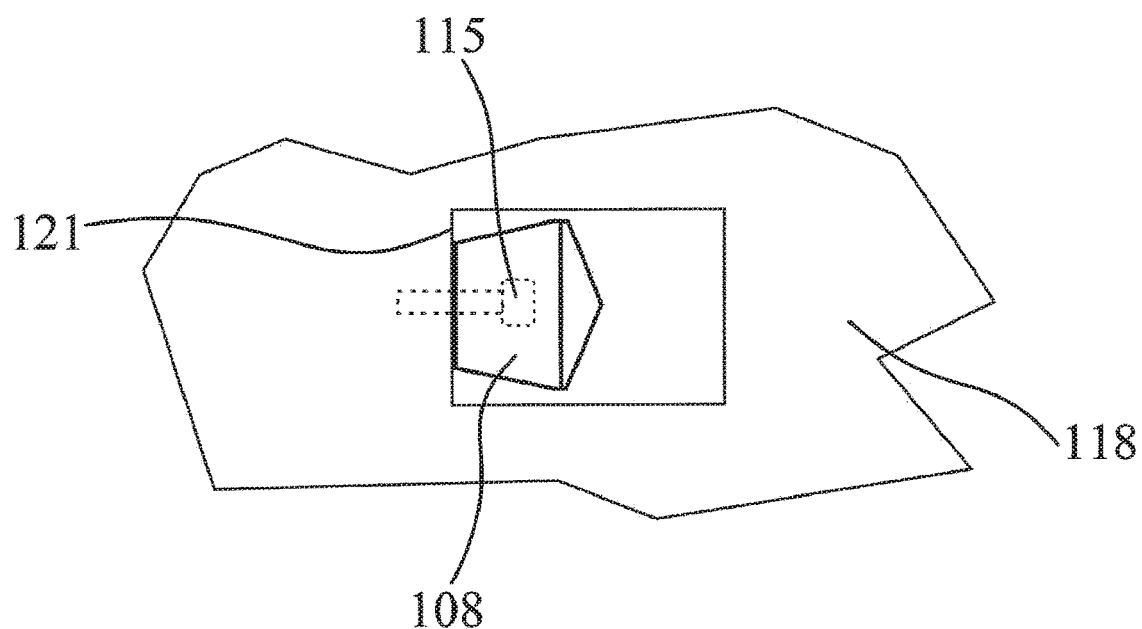
FIG. 5 is a top end view of an inner cutting tooth mounted in a cutter recess on the disc cutter.

FIGS. 1, 2, 3, 4, 5, and 6 depict a disc cutter 100 for use with a counter rotating mulching mower assembly 200, together with the cutting teeth 110 mounted in cutter recesses 102 and cutter apertures 106. FIG. 1 shows disc cutter 100 which is comprised of disc shaft 119, multiple cutter recesses 102 spaced evenly around outer edge 116 and multiple cutter apertures 106 randomly spaced on top surface 118. Apertures 106 extend through disc cutter 100. Cutting teeth 110 are mounted with mounting bolts 115.

Outer cutting teeth 104 are mounted in cutter recess 102 with mounting bolt 115 so outer cutting edge 112 is positioned beyond outer edge 116. Inner cutting teeth 108 are mounted in cutter apertures 106 with mounting bolts 115 so that outer cutting edge 112 is spaced above top surface 118 and bottom cutting edge 113 is spaced below bottom surface 120 (see FIG. 2).

Figure 6:
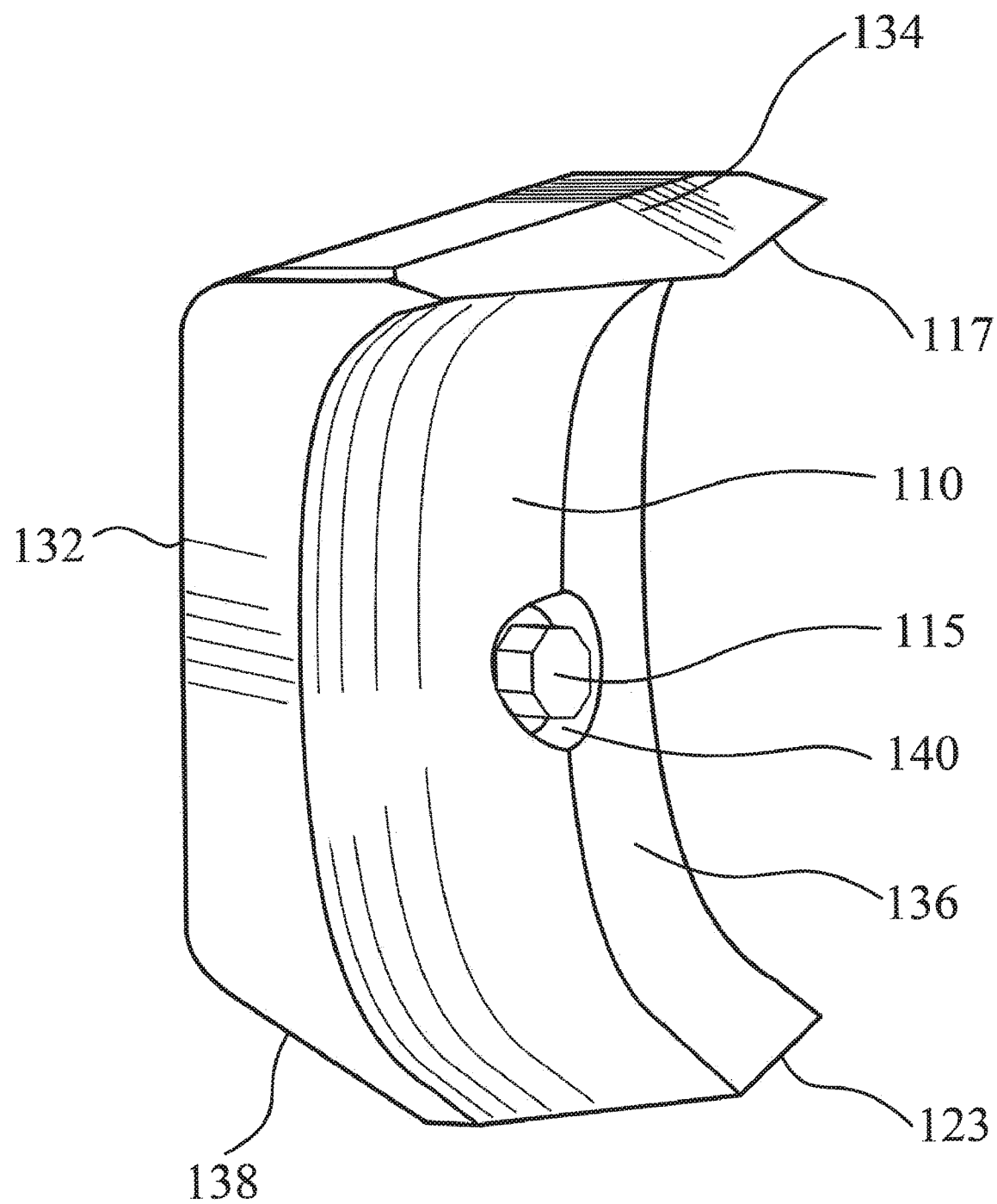
FIG. 6 is a top front perspective view of a cutting tooth.

A cutting tooth 110 is depicted in FIG. 6 and includes a top surface 134, a back surface 132, a bottom surface 138, inner surface 136, first cutting edge 117 and second cutting edge 123. When mounted, mounting bolt 115 goes through mounting recess 140 on inner surface 136 to back surface 132 and into mounting surface 121 of a cutter recess 102 or a cutter aperture 106. When first cutting edge 117 of outer cutting edge 112 wears down and is no longer effective, outer cutting tooth 104 can be rotated around mounting bolt 115 so that second cutting edge 123 extends beyond outer edge 116 and is used for cutting.

Figure 7:
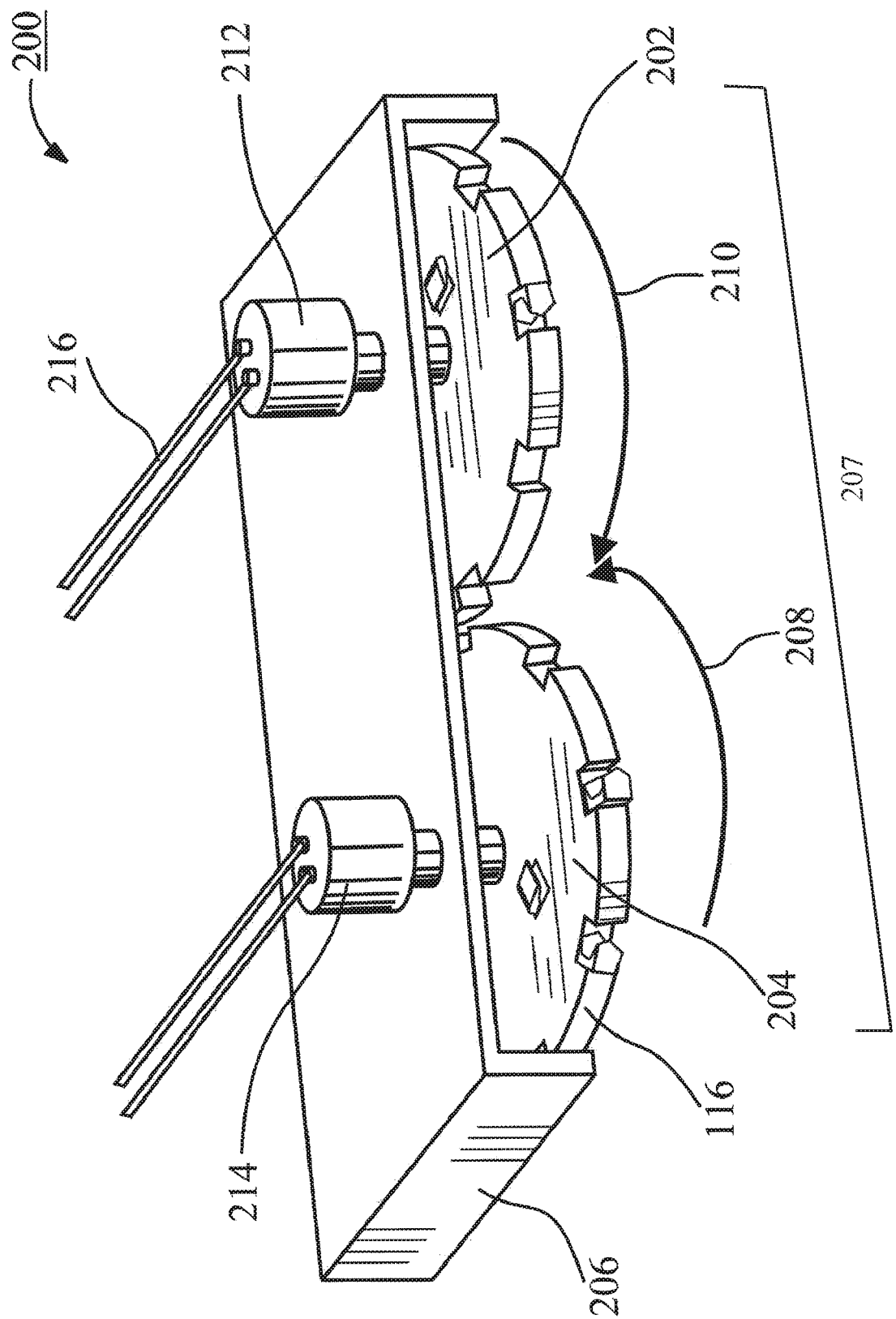
FIG. 7 is a schematic top front perspective view of the counter rotating mulching mower assembly.
Figure 8:
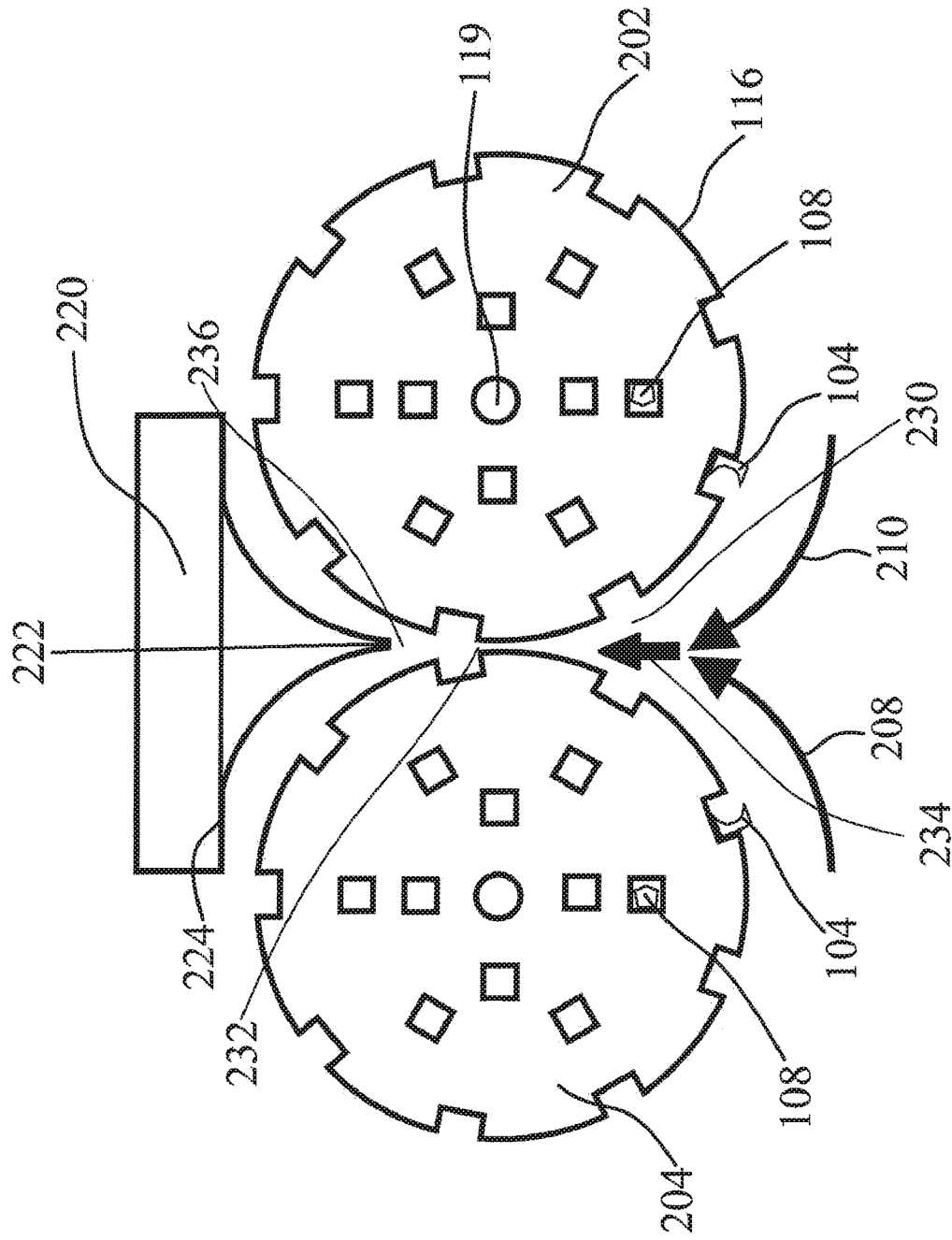
FIG. 8 is a schematic top end view of two counter rotating cutting discs in use with an anvil.

FIGS. 7 and 8 schematically depict an embodiment of counter rotating mulcher mowing assembly 200 which is comprised of mower housing 206, first disc cutter 202, and second disc cutter 204. Disc cutter 202 and 204 extend out of inlet 207 in mower housing 206. Mower assembly 200 further includes anvil 220, first hydraulic motor 212, second hydraulic motor 214 and hydraulic lines 216. First hydraulic motor 212 turns first disc cutter 202 in first rotation direction 210, which is normally a clockwise direction. Second hydraulic motor 214 turns second disc cutter 204 in second rotation direction 208, which is normally a counter-clockwise direction. Hydraulic lines 216 connect first hydraulic motor 212 and second hydraulic motor 214 to hydraulic power sources.

First rotation direction 210 and second rotation direction 208 result in first disc cutter 202 and second disc cutter 204 rotating toward each other so that cutting material is directed to inlet area 230 in inward direction 234 (see FIG. 8) before entering cutter approach area 232 between first disc cutter 202 and second disc cutter 204. The cutting material is further cut in cutter approach area 232 while moving in inward direction 234 before exiting cutter approach area 232 and entering outlet area 236, which is adjacent a back wall of mower housing 206. As material is ejected from outlet area 236, it impinges on anvil 220 where it is split by vertical cutting edge 222 and then pushed against horizontal cutting edge 224 (of anvil 220).

Figure 9:
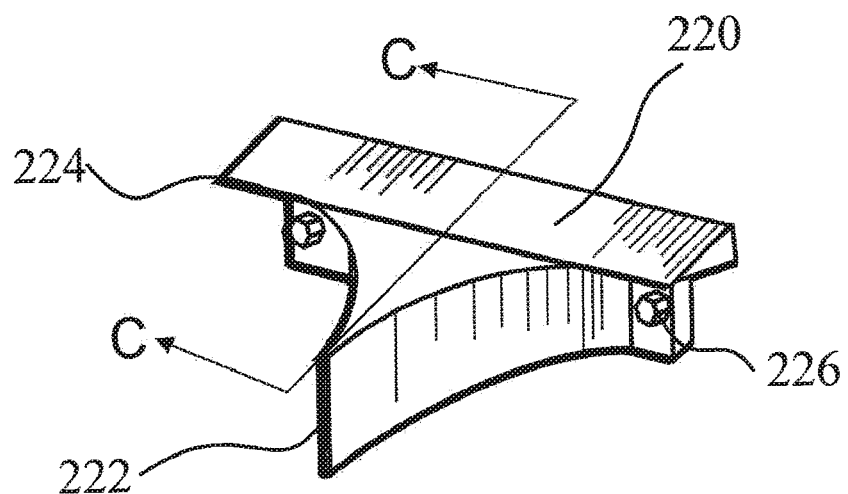
FIG. 9 is a top front left perspective view of the anvil.
Figure 10:
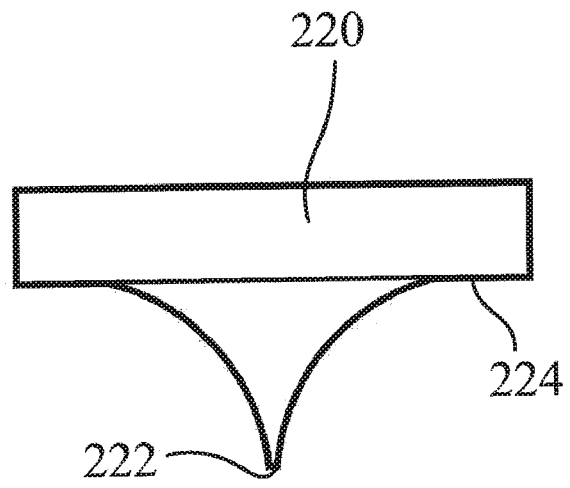
FIG. 10 is a plan view of the anvil.
Figure 11:
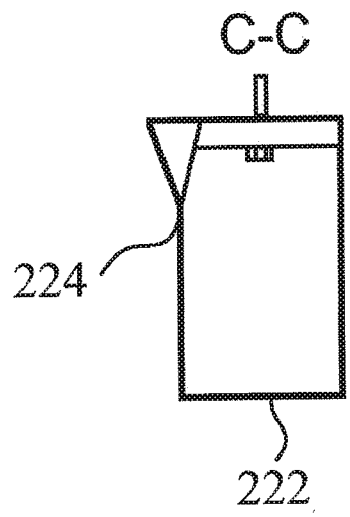
FIG. 11 is a cross section of section C-C of the anvil in FIG. 9.

FIGS. 9, 10 and 11 depict anvil 220 which is generally comprised of horizontal cutting edge 224 and vertical cutting edge 222. Anvil 220 may be made of hardened metal that is capable of cutting and shredding material that is brought into contact with it. Attaching bolts 226 secure anvil 220 to mower housing 206. Anvil 220 is releasably securable to mower housing 206 in outlet area 236 and may be replaced or removed should anvil 220 require repair or should vertical cutting edge 222 and/or horizontal cutting edge 224 require sharpening.

Figure 12:
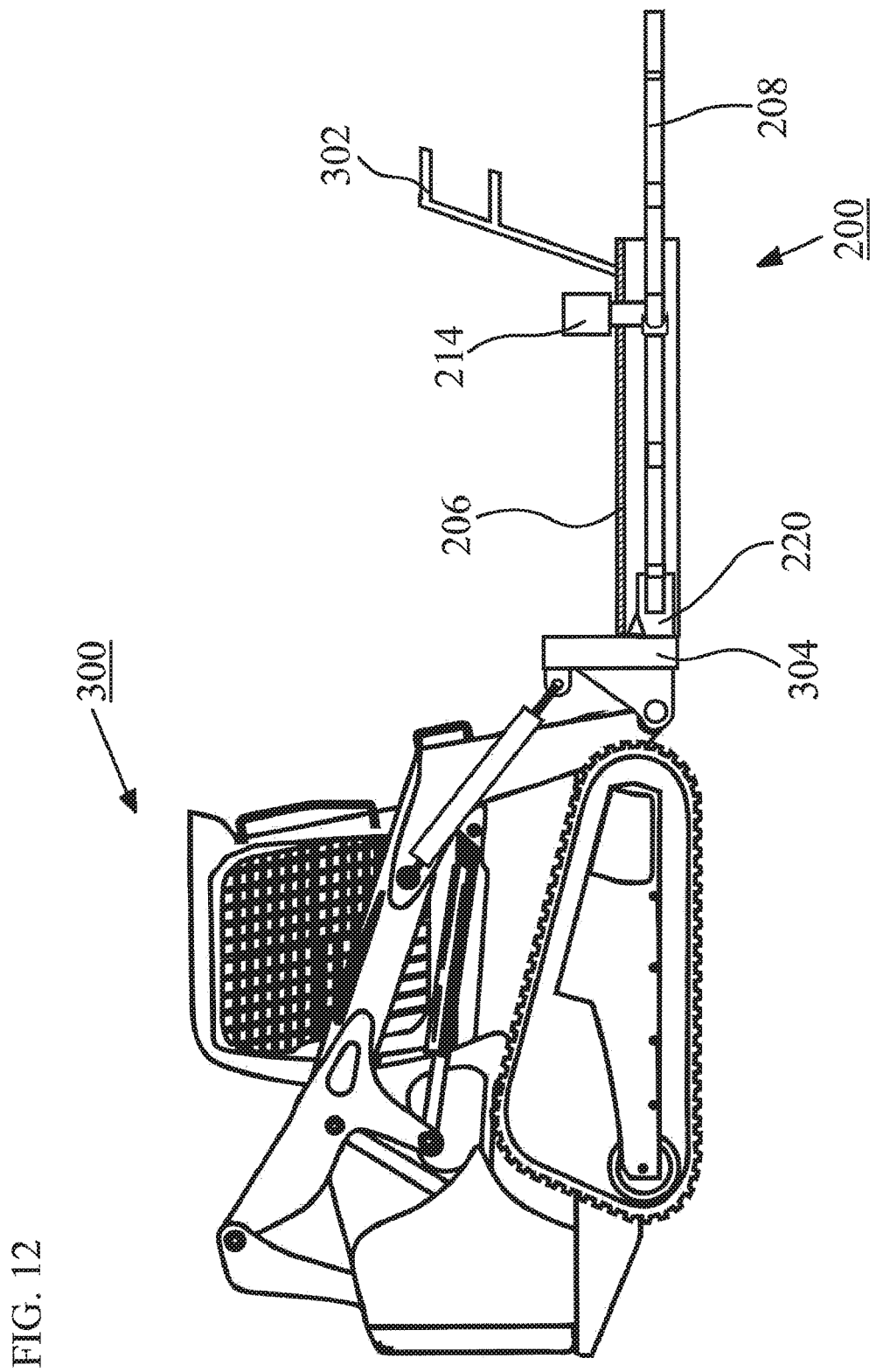
FIG. 12 is a schematic side elevation view of the counter rotating mulching mower assembly in use with a skid steer vehicle.

FIG. 12 is a schematic depiction of counter rotating mulching head mower 200 installed on skid steer vehicle 300. Counter rotating mulching mower 200 is mounted to skid steer vehicle 300 by attaching mower housing 206 to attachment frame 304. Additionally, a guard fence 302 may be mounted on mower housing 206.

In Use

In use, vegetation, small trees and brush to be cleared is directed between first disc cutter 202 and second disc cutter 204 and is cut by outer cutting teeth 104 and inner cutting teeth 108. Chips and debris are directed by the counter rotating inward motion of first disc cutter 202 and second disc cutter 204 into mower housing 206 and toward anvil 220. Chips and debris are further cut as they impinge upon vertical cutting edge 222 of anvil 220.

Vertical cutting edge 222 helps to direct chips to either side of anvil 220 where they are cut further between the outer edges 116 of the disc cutters 202, 204 and horizontal cutting edge 224 of anvil 220.

Material that impinges upon the top surface 118 or the bottom surface 120 of the disc cutters 202 and 204 is cut by the inner cutting teeth 108.

In an embodiment, first disc cutter 202 and second disc cutter 204 are each approximately 30" in diameter, which helps to prevent the assembly from causing the multipurpose vehicle, such as a skid steer vehicle or tractor, from tipping forward. The smaller diameter disc cutters 202 and 204 provide less forward tipping moment than a larger, heavier, single rotating disc cutter found in prior art devices.

The counter rotating motion of disc cutters 202 and 204 helps to reduce the risk of chips and cutting debris shooting out the side or front of the apparatus and hitting bystanders.

FIGS. 13-16 depict a mower assembly 300 according to an alternative embodiment. Similar to mower assembly 200 described above, mower assembly 300 includes first and second disc cutters 202, 204 having cutting teeth 110 mounted in cutter recesses 102 and cutter apertures 106. FIG. 13 shows mower assembly 300 where each disc cutter includes a disc shaft 119, multiple cutter recesses 102 spaced evenly around outer edge 116, and multiple cutter apertures 106 on top surface 118.

In this embodiment, mower housing 206 includes arcuate inner walls 302 generally shaped to follow the curvatures of outer edges 116 of first and second disc cutters 202, 204. Inner walls 302 provide curved inner surfaces without corners which discourages a build-up of material within mower housing 206.

As depicted, a portion of inner wall 302 that is adjacent the back wall of mower housing 206 extends around disc cutters 202, 204 to effectively form vertical cutting edge 222 and horizontal cutting edge 224 of the anvil. In this manner, the anvil is formed as a unitary component with mower housing 206.

Inner walls 302 may extend to partially wrap around the front of first and second disc cutters 202, 204, thereby reducing the size of inlet 207. This wrap-around of inner walls 302 helps to prevent the ejection of material through inlet 207 as material is flung from disc cutters 202, 204 while they rotate. That is, as material that is carried by the rotating discs moves in a circular pattern within the mower housing, the arcuate inner walls tend to encourage the rotating material to be fed back into inlet area 230, where it is against subject to cutting and shredding, rather than being flung outwardly through inlet 207.

Figure 15:
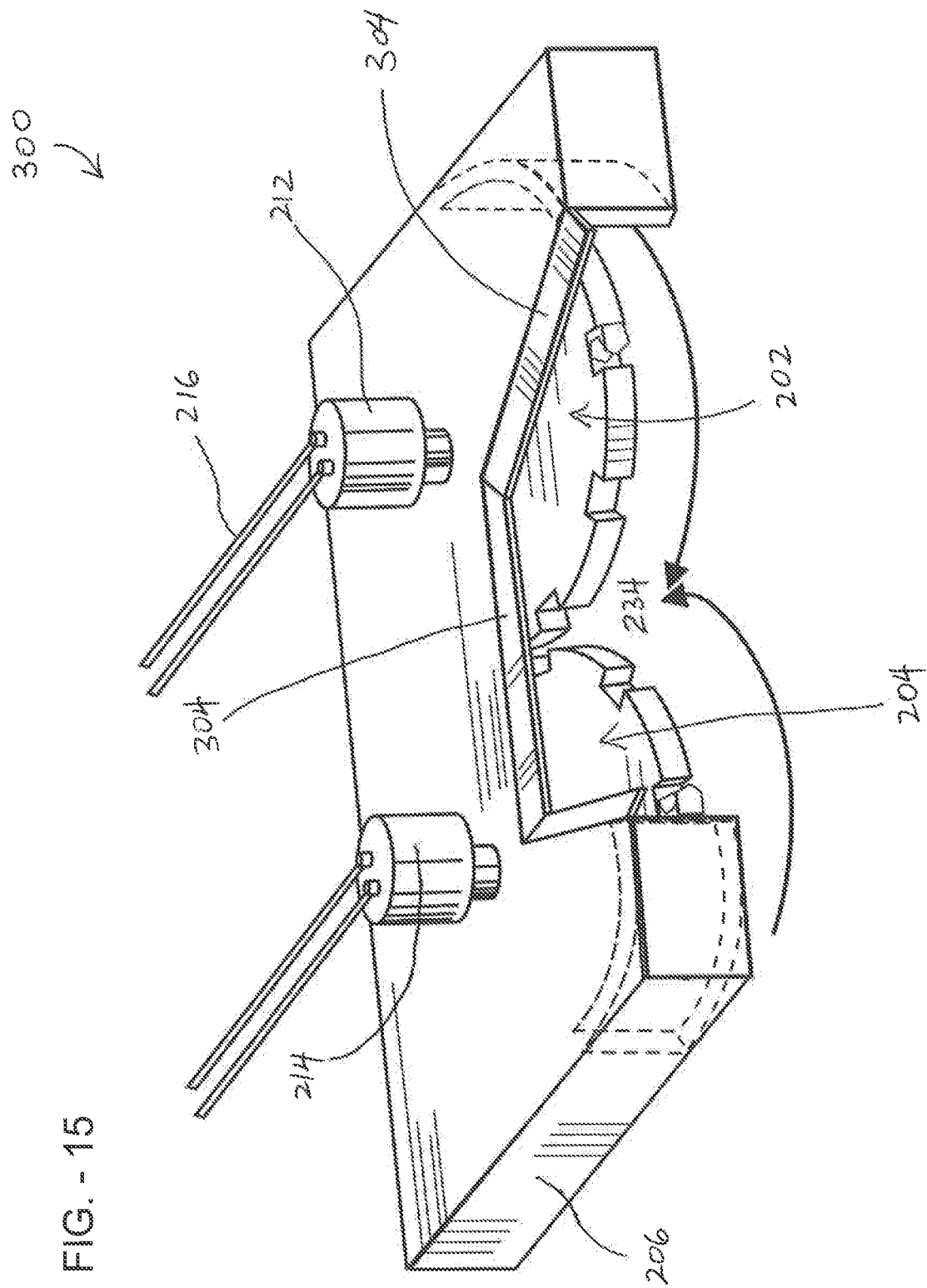
FIG. 15 is a schematic top front perspective view of the counter rotating mulching mower assembly of FIG. 13.

Turning to FIG. 15, mower assembly 300 may further include deflectors 304 extending from the upper surface of mower housing 206, adjacent the inlet towards inlet area 234, at a downward angle. In this manner, deflectors 304 direct or deflect material that may tend to be ejected upwardly from inlet area 234 back into mower housing 206 and toward disc cutters 202, 204.

Mower assembly 300 may further include an inlet cover 306 dimensioned to engage with inlet 207 and to generally enclose inlet area 234. Inlet cover 306 is operatively coupled to mower housing 206 between an open configuration, where inlet area 234 may laterally receive material through inlet 207, and a closed configuration, where disc cutters 202, 204 are enclosed or generally enclosed within mower housing 206 (see FIG. 16).

As will be understood by the skilled person, inlet cover 306 may be operatively coupled to mower housing 206 using a number of different mechanisms. For example, inlet cover 306 may be rotatably secured to mower housing 206 via a hinge. One or more hydraulic cylinders may be secured to mower housing 206 for opening and closing inlet 207 through rotation or sliding inlet cover 306 relative to mower housing 206. Regardless of the method of activation that is used, when in its closed configuration, inlet cover 306 further limits the ejection of material from the mower housing and encourages a more complete mulching or pulverization of debris.

It should be apparent to persons skilled in the arts that various modifications and adaptation of this structure described above are possible without departure from the spirit of the invention the scope of which defined in the appended claim.

I claim:

1. A mower assembly for cutting and mulching material, the mower assembly comprising:
    a) a mower housing having an inlet, an opposed back wall, an inlet area adjacent the inlet, and an outlet area adjacent the back wall;
    b) a first disc cutter having a first outer edge, the first disc cutter rotatably mounted to the mower housing for rotation in a first direction;
    c) a second disc cutter having a second outer edge, the second disc cutter rotatably mounted to the mower housing for rotation in a second opposite direction;
    each disc cutter having a top surface and a bottom surface, the first and second disc cutters orientated to form a common plane and positioned such that the first outer edge and the second outer edge are spaced apart, counter-rotation of the first disc cutter and the second disc cutter urging material at the inlet area to travel between the first and second disc cutters towards the outlet area within the mower housing, material travelling from the inlet area to the outlet area being subject to cutting and shredding by cutting teeth on said first and second disc cutters; and
    d) an anvil mounted to the mower housing in the outlet area for further cutting and shredding of the material, the anvil comprising a vertical cutting edge extending from the back wall between the first and second disc cutters, the vertical cutting edge for cutting material travelling from said inlet area to said outlet area.

2. The mower assembly as claimed in claim 1, wherein the anvil comprises a horizontal cutting edge orientated generally parallel to the common plane and extending generally perpendicular relative to the vertical cutting edge, the horizontal cutting edge for cutting material travelling rearwardly from the vertical cutting edge.

3. The mower assembly as claimed in claim 2, wherein the anvil is releasably securable to the mower housing in the outlet area.

4. The mower assembly as claimed in claim 2, wherein the anvil is formed as a unitary part with the mower housing.

5. The mower assembly as claimed in claim 1, wherein the mower housing includes arcuate inner walls shaped to follow the curvatures of the first and second outer edges of the first and second disc cutters, the inner walls configured to discourage a build-up of material within the mower housing and to help prevent ejection of material from the inlet.

6. The mower assembly as claimed in claim 5, wherein a portion of the inner walls form the vertical cutting edge.

7. The mower assembly as claimed in claim 1, wherein each disc cutter has inner cutting teeth, each inner cutting tooth having an upper cutting edge extending from the top surface of its corresponding disc cutter, said upper cutting edge for cutting material above the top surface of the disc cutter.

8. The mower assembly as claimed in claim 1, wherein each disc cutter has inner cutting teeth, each inner cutting tooth having a lower cutting edge extending from the bottom surface of its corresponding disc cutter, said lower cutting edge for cutting material below the bottom surface of the disc cutter.

9. The mower assembly as claimed in claim 1, wherein each disc cutter has inner cutting teeth, each inner cutting tooth having an upper cutting edge and a lower cutting edge extending, respectively, from the top surface and the bottom surface of its corresponding disc cutter, the inner cutting teeth for cutting material above the top surface and below the bottom surface of their respective disc cutters.

10. The mower assembly as claimed in any one of claims 7 to 9, wherein each disc cutter includes cutter apertures extending there through, each inner cutting tooth mounted within one of the cutter apertures.

11. The mower assembly as claimed in claim 1, wherein each disc cutter includes:
    cutter recesses defined in its outer edge, and
    an outer cutting tooth mounted within each cutter recess, each outer cutting tooth having a first cutting edge.

12. The mower assembly as claimed in claim 11, wherein the first cutting edge of each outer cutting tooth extends beyond the outer edge of its corresponding disc cutter.

13. The mower assembly as claimed in claim 12, wherein each outer cutting tooth has an opposed second cutting edge, each outer cutting tooth releasably mounted within a corresponding cutter recess such that each outer cutting tooth may be rotated to permit the second cutting edge to extend beyond the outer edge of its corresponding disc cutter.

14. The mower assembly as claimed in claim 1, wherein the mower housing further includes a deflector to deflect material, that may tend to be ejected from said inlet area, towards the disc cutters.

15. The mower assembly as claimed in claim 1, further including an inlet cover dimensioned to engage the inlet and to generally enclose the inlet area, the inlet cover movable between an open configuration and a closed configuration, when in its open configuration the inlet cover disengaged from the inlet, when in its closed configuration the inlet cover generally enclosing the inlet area.

16. The mower assembly as claimed in claim 15, wherein one or more hydraulic cylinders move the inlet cover between its open and its closed configurations.

17. A mower assembly for cutting and mulching material, the mower assembly comprising:
 a) a mower housing having an inlet, an opposed back wall, an inlet area adjacent the inlet, and an outlet area adjacent the back wall;
 b) a first disc cutter having a first outer edge, the first disc cutter rotatably mounted to the mower housing for rotation in a first direction;
 c) a second disc cutter having a second outer edge, the second disc cutter rotatably mounted to the mower housing for rotation in a second opposite direction;
 each disc cutter having a top surface and a bottom surface, the first and second disc cutters orientated such that the first outer edge and the second outer edge are spaced apart, counter-rotation of the first disc cutter and the second disc cutter urging material at the inlet area to travel between the first and second disc cutters towards the outlet area within the mower housing, material travelling from the inlet area to the outlet area being subject to cutting and shredding by cutting teeth on said first and second disc cutters; and
 d) an anvil comprising a vertical cutting edge extending from the back wall between the first and second disc cutters, the vertical cutting edge for cutting material travelling from said inlet area to said outlet area,
 each disc cutter having inner cutting teeth, each inner cutting tooth having an upper cutting edge and a lower cutting edge extending, respectively, from the top surface and the bottom surface of its corresponding disc cutter, the inner cutting teeth for cutting material above the top surfaces and below the bottom surfaces.

18. A mower assembly for cutting and mulching material, the mower assembly comprising:
 a) a mower housing having an inlet, an opposed back wall, an inlet area adjacent the inlet, and an outlet area adjacent the back wall;
 b) a first disc cutter having a first outer edge, the first disc cutter rotatably mounted to the mower housing for rotation in a first direction;
 c) a second disc cutter having a second outer edge, the second disc cutter rotatably mounted to the mower housing for rotation in a second opposite direction;
  each disc cutter having a top surface and a bottom surface, the first and second disc cutters orientated such that the first outer edge and the second outer edge are spaced apart, counter-rotation of the first disc cutter and the second disc cutter urging material at the inlet area to travel between the first and second disc cutters towards the outlet area within the mower housing, material travelling from the inlet area to the outlet area being subject to cutting and shredding by said first and second disc cutters; and
 (d) an anvil mounted to the mower housing in the outlet area for further cutting and shredding of the material, the anvil comprising a vertical cutting edge extending from the opposed back wall between the first and second disc cutters, the vertical cutting edge for cutting material travelling from said inlet area to said outlet area,
the mower housing including arcuate inner walls shaped to follow the curvatures of the first and second outer edges of the first and second disc cutters, the inner walls configured to discourage a build-up of material within the mower housing and to help prevent ejection of material through the inlet.

\* \* \* \* \*